United States Patent
Brandt

[15] 3,673,059

[45] June 27, 1972

[54] DRY CLEANABLE VINYL TYPE ARTIFICIAL LEATHER

[72] Inventor: Jack P. Brandt, South Bend, Ind.

[73] Assignee: Uniroyal, Inc., New York, N.Y.

[22] Filed: May 13, 1970

[21] Appl. No.: 37,017

[52] U.S. Cl.................................161/88, 161/190, 117/138.8, 117/86, 260/850, 260/853, 260/856, 260/859 PV
[51] Int. Cl. .........................................B32b 7/10, B32b 27/06
[58] Field of Search ..................................260/850, 853, 856; 117/138.8 D, 76 T; 161/190

[56] References Cited

UNITED STATES PATENTS

| | | | |
|---|---|---|---|
| 3,137,666 | 6/1964 | Lox et al.................................. | 260/853 |
| 3,211,676 | 10/1965 | Spencer................................... | 260/853 |
| 3,311,527 | 3/1967 | Urbanic et al. .......................... | 161/190 |
| 3,336,183 | 8/1967 | Larner et al. ............................ | 161/190 |
| 3,496,056 | 2/1970 | Steel et al. ............................... | 161/85 |

*Primary Examiner*—Morris Sussman
*Attorney*—James J. Long

[57] ABSTRACT

Blends of thermoplastic polyurethane elastomer, vinyl chloride-vinyl acetate-vinyl alcohol terpolymer, and hexakis(methoxymethyl)melamine resin cast from solution and cured by heating are resistant to dry cleaning. Material in the form of a sheet including a layer having the stated composition may have a patent leather finish, and the flexibility may be varied, for use in clothing or footwear, usually in combination with a textile fabric layer as a backing.

14 Claims, No Drawings

DRY CLEANABLE VINYL TYPE ARTIFICIAL LEATHER

BACKGROUND OF THE INVENTION

1. Field of the Invention

The invention relates to a composition, and sheet material based on such composition.

2. Description of the Prior Art

There have been attempts to make a smooth patent finished material from both polyvinyl chloride and polyurethane, either singly or in combined lamination, but none altogether successful.

The following U.S. Pat. Nos. are of interest, but are not suggestive of the invention: 2,512,726, Penn et al.; 3,385,805, Pieters; and 3,387,989, West et al.

SUMMARY OF THE INVENTION

The invention is concerned with controlling the slip, flexibility and durability of a synthetic leather type material for clothing and footwear, particularly of the patent leather type, through the use of a crosslinking vinyl resin in a polyurethane elastomer. A melamine resin in the composition reduces the solubility of the vinyl resin, improving the dry cleaning qualities. Through changing the formulation of the materials, it is possible to change the surface condition from a rather tacky, very flexible material to a more harsh, dry, slippery finish.

DETAILS OF THE INVENTION

The invention achieves its objectives with the aid of a composition comprising a blend of (A) thermoplastic polyurethane elastomer with (B) vinyl chloride-vinyl acetate-vinyl alcohol copolymer resin.

Thermoplastic polyurethane elastomer as used in the invention is a conventional material (see, for example "Polyurethane Technology," by Bruins, Interscience Publishers, pages 198-200; also "Modern Plastics Encyclopedia," 1968, page 289). Examples are such polyether based polyurethane as that made from 2 moles of polytetramethylene ether glycol, 2 moles of MDI (diphenyl-methane diisocyanate) and 1 mole of 1,4-butane diol, and polyester based polyuethanes such as are similarly derived from 1,4-butane diol-adipic acid polyester and MDI (Rubber Chemistry and Technology, Vol. 35, 1962, page 742, Schollenberger et al.). Commercially available materials of this category include Estane 5701 or 5640X071. Many such products may be described as reaction products of a polymeric polyol (e.g. a polyester glycol or a polyether glycol) with an organic polyisocyanate, usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35).

The vinyl chloride-vinyl acetate-vinyl alcohol copolymer resin employed in the composition of the invention is also a well-known material (described in "Polyvinyl Chloride" by Sarvetnick, page 24, as produced by hydrolysis of acetate groups in vinyl chloride-acetate copolymer). It is referred to as a cross-linking vinyl, the cross-linking capability being a consequence of the presence of hydroxyl groups.

The ratio of the polyurethane elastomer to the described vinyl resin may be varied in order to provide the optimum physical properties in particular laminates or particular layers of laminates. Frequently blends of the invention will contain from 30 to 90 parts, preferably 40-85 parts of the polyurethane (A) and from 10 to 70 parts, preferably 15 to 60 parts, of the described vinyl resin (B), per 100 parts by weight of polyurethane plus vinyl resin. The addition of the vinyl to the urethane gives good flexibility and toughness, but with very low amounts unsuitable for some surface applications because of residual tack. Therefore for use as a slip coat or skin coat, forming the outer layer of an article made in accordance with one form of the invention, the composition usually has higher amounts of vinyl, resulting in a rather hard, dry, wear-resistant coat, of the patent leather type suitable for footwear or other items where a very soft hand or drape is not required. Thus, patent leather footwear skin coat formulations may be based on 35-65 parts, preferably 40-55 parts, of urethane (A) and 35-65 parts, preferably 45-60 parts, of vinyl (B), per 100 parts by weight of (A) plus (B). Back-up coats or underlayers containing less vinyl result in a very flexible, somewhat tacky layer with good laminating qualities. Thus, undercoat or laminating layer formulations may be based on 70-90 parts, preferably 75-85 parts, of polyurethane (A) and 10-30, preferably 15-25 parts, of the vinyl resin (B), per 100 parts by weight of (A) plus (B); such low-vinyl formulations are also adaptable to formation of skin coats or slip coats where high flexibility, soft hand and good draping qualities are desired, as in various articles of clothing or garments.

Another aspect of the invention involves including amino resin, especially melamine resin, and particularly etherified melamine resin, in the composition. For this purpose the known material, hexakis(methoxymethyl)-melamine, represented by the commercially available resin known as Cymel (Modern Plastics Encyclopedia, 1968, page 156), is suitable. Only a small amount of this resin, say 0.5 to 10 parts, preferably 1 to 7 parts, per 100 parts by weight of urethane (A) plus vinyl (B), need be employed. One or more layers of the laminate include a blend containing the melamine resin, to confer optimum resistance to dry cleaning.

The composition of the invention may be formed into a film, sheet or coating by any suitable conventional method. A particularly suitable way is to dissolve the composition in a conventional inert organic solvent or mixture of solvents in which the ingredients are soluble. The solution may then be applied in any suitable conventional manner, as by painting, spreading, coating or spraying, to a surface on which it is desired to form the film or sheet, after which the solvent is evaporated, leaving behind a continuous deposit composed of the composition of the invention. The removal of the solvent is facilitated by heating, for example by infra red heaters or in an oven, and such heating also serves to set or cure the coating. While it is not desired to limit the invention to any particular theory of operation, it is believed that as a consequence of the heating the composition becomes cross-linked. It is conjectured that the described melamine resin may exert a curing action, possibly by reacting with hydroxyl groups in the vinyl copolymer. In any event it increases the toughness of the compound, and the solubility of the vinyl resin is reduced, enhancing the dry cleanability of the product.

The material may be deposited from solution onto a temporary casting surface or release surface which forms no part of the final product, or onto a surface which becomes an integral part of the final product. The final product may comprise one or more cast films or sheets of the blend of the invention without any additional support or backing, but more typically the final product is a laminate supported by some other sheet material such as a textile fabric, paper, cellular material, polyvinyl chloride sheet or film, or various combinations of such supporting materials, laminated with or without the aid of suitable adhesives.

One construction suitable for example for clothing applications, in a recommended gauge of 0.0015 inch for example, has a textile backing, and an undercoat or laminate layer containing melamine resin and a relatively low proportion of the vinyl resin (B), and, on the surface of such laminate layer, an outer layer or slip coat containing melamine resin and a relatively high proportion of the vinyl resin (B). A napped fabric may be used to provide a crushed appearance.

A construction similar to the foregoing, preferred in garments where optimum flexibility, soft hand and good drape are required, uses a slip coat containing no melamine resin and a relatively low proportion of the vinyl resin (B).

Another preferred construction suitable for example for footwear, in considerably heavier gauges of the order of 0.020 inch, has a fabric backing, a conventional plasticized polyvinyl chloride layer on the fabric, a conventional adhesive on the polyvinyl chloride layer, and finally an outer-most skin coat made of the composition of the invention containing a relatively high proportion of the described vinyl resin (B).

The following examples, in which all quantities are expressed by weight, will serve to illustrate the practice of the invention in more detail.

EXAMPLE 1

This example illustrates the preparation of a laminated fabric.

The following slip coat or outercoat formulation is prepared:

Slip Coat Formulation I

|  | Parts Wet | Actual |
|---|---|---|
| Thermoplastic polyurethane elastomer solution | 43.6 | 8.7 |
| Hydroxy-containing vinyl copolymer resin solution | 33.4 | 10.7 |
| Melamine resin | .5 | .5 |
| Silicone oil | .83 | .83 |
| Pigment concentrate | 21.7 | 3.0 |

The thermoplastic polyurethane elastomer may be of the polyester type (e.g., reaction product of 1,4-butane dioladipic acid polyester with MDI, as represented by such commercially available materials as Estane 5701; see also the Schollenberger article referred to above). The solution of the elastomer may contain 8.7 parts of the polymer dissolved in 17.45 parts of tetrahydrofurane (sometimes abbreviated as "THF") and 17.45 parts of cyclohexanone. The hydroxy-containing copolymer resin may be the commercial material known as VAGH which contains 91 percent vinyl chloride, 3 percent vinyl acetate and 5.7 percent hydroxyl calculated as vinyl alcohol; 10.7 parts of the resin may be dissolved in 11.35 parts of tetrahydrofurane and 11.35 parts of cyclohexanone. The melamine resin may be the commercially available material known as Cymel, which is hexakis(methoxymethyl)melamine. The silicone oil is a poly(dimethyl siloxane) commercially available as Union Carbide S-10 (specific gravity, 0.85; viscosity at 25° C, 1 to 2 CSTK.); its function is to aid in parting of the laminate from the release paper and to aid in providing a desirable viscosity in the coating solution.

The pigment concentrate may be 3.0 parts of a pigment chip (such as 40 percent carbon black and 60 percent polyvinyl chloride) dispersed in 9.35 parts of tetrahydrofurane and 9.35 parts of cyclohexanone.

Onto the surface of a running length of release paper, a coating of the foregoing slip coat formulation is applied with the aid of a rotogravure print roller, and the assembly is passed through an oven having a first zone heated to about 200° F and a subsequent zone heated to about 250° F. The coated paper takes one minute to transverse the oven; the dry deposited film is 0.0005 inch thick.

The following laminate coat or undercoat formulation is prepared:

Laminate Coat Formulation II

|  | Parts Wet | Actual |
|---|---|---|
| Estane 5701 (THF-cyclohexanone solution) | 72 | 14.4 |
| VAGH (THF-cyclohexanone solution) | 10.5 | 3.36 |
| Cymel resin | .25 | .25 |
| S-10 silicone | .25 | .25 |
| Pigment concentrate | 6.5 | 3.0 |
| Cyclohexanone | 10.2 | — |

The foregoing laminate formulation, which provides residual tack for good lamination, is reverse roll coated at the rate of 0.8 ounce (dry) per square yard onto the surface of the previously applied skin coat. The assembly is passed in a period of two minutes through an oven having progressively hotter zones at temperatures of 180°, 200° and 250° F. Then another coating of the laminate formulation is applied by reverse roll coating, at a rate of 0.7 ounce (dry) per square yard, and onto this deposit there is pressed a layer of textile fabric. The assembly is passed in a period of two minutes through an oven having zones at 200°, 250° and 300° F. Thereafter the resulting cured laminate, with the fabric backing firmly united to the laminate layer, is stripped away from the release paper. The resulting patent leather finish sheet material is rather flexible, non-porous, with a non-tacky surface which is rather hard, dry and wear-resistant.

EXAMPLE 2

This example illustrates the preparation of a product suitable for making footwear uppers.

The following skin coat formulation is provided:

Skin Coat Formulation III

|  | Wet Parts | Dry |
|---|---|---|
| Polyurethane (THF-cyclohexanone solution) | 52.5 | 10.5 |
| Vinyl copolymer resin (THF-cyclohexanone solution) | 30.1 | 9.6 |
| Melamine resin | 1.05 | 1.05 |
| Silicone | 3 | 3 |
| Pigment concentrate | 4.0 | 1.85 |
| Cyclohexanone | 20.25 | — |

The ingredients in the skin coat formulation are as described previously. Onto a release paper the skin coat formulation is reverse roll coated at a rate of 0.8 ounce per square yard. The solvents are evaporated by passing the assembly through an oven, over a period of 2 minutes having heated zones at 180°–200°–250° F. The following adhesive formulation is provided:

Urethane Adhesive Formulation IV

| Liquid polyester polyurethane prepolymer | 34.7 |
|---|---|
| TDI (tolylene diisocyanate) | 2.7 |
| Methyl ethyl ketone | 27.8 |
| Cyclohexanone | 34.8 |

The polyurethane prepolymer used in the adhesive may be prepared from a polyester such as polyethylene adipate and TDI (see, for example, U.S. Pat. No. 3,379,691, Sundholm, Apr. 23, 1968) or equivalent commercially available material such as Goodrich A-1060B. The adhesive has a pot life of about 8 hours. The adhesive is rotoprinted onto the exposed surface of the previously applied skin coat, at a rate of 0.1 ounce per square yard. The assembly is passed through an oven in one minute heated at 200°–250° F. The following low temperature footwear vinyl plastisol formulation is provided:

Low Temperature Vinyl Footwear Compound V

|  | Parts |
|---|---|
| Polyvinyl chloride resin powder (Marvinol VR-50 | 100 |
| Dioctyl phthalate | 25 |
| Octyl decyl phthalate | 33.4 |
| Stabilizer (e.g. dibasic lead stearate) | 2.0 |
| Carbon black | .65 |
| Total: | 161.05 |

Two successive coats of the foregoing plastisol are applied over the adhesive-coated surface by tandem reverse rollers applying 13 ounce and 8 ounce coatings (total 21 ounces per square yard). Sateen fabric is pressed onto the top of the plastisol. The assembly is heated for 2-3 minutes at 300° F to fuse the plastisol. The fabric becomes firmly united to the plasticized polyvinyl chloride and the latter becomes firmly united to the skin coat through the intermediate polyurethane adhesive layer. The resulting non-porous footwear upper material is flexible and has a durable non-tacky patent leather finish provided by the skin coat.

EXAMPLE 3

This example illustrates a sheet material suitable for clothing, which is highly flexible and has desirable hand and drape. The material has a soft hand non-patent finish.

The following slip coat formulation may be prepared:

Non-Patent Soft Hand Slip Coat

Formulation VI

|  | Parts Wet | Actual |
|---|---|---|
| Estane 5701 (solution in 50:50 cyclohexanone-tetrahydrofurane) | 62 | 12.4 |
| VAGH (solution in 50:50 cyclohexanone-tetrahydrofurane) | 8.7 | 2.78 |
| Syloid 73 silica gel (anhydrous silica in cyclohexanone) | 22.5 | 3.5 |
| Pigment concentrate | 21.7 | 3.0 |

The silica gel serves as a slip agent. A slick release paper may be coated with the foregoing formulation by a reverse roller at the rate of 0.9 ounce per square yard. The coating may be heated two minutes in a zoned oven at 180°-200°-250° F temperatures. The rest of the procedure may be the same as in Example 1, that is, the laminate coat formulation II may be reverse roller coated at 0.7 ounce per square yard, the fabric may be pressed on, and the assembly heated two minutes at 200°-250°-300° F in the zoned oven, after which the cured laminate is stripped from the release paper. This laminate is remarkable for its good hand and drape (the melamine resin having been omitted from the slip coat), and yet is is sufficiently resistant to dry cleaning since the laminate coat does contain the melamine resin.

Having thus described my invention, what I claim and desire to protect by Letters Patent is:

1. A composition suitable for forming a dry-cleanable artificial leather sheet material comprising a blend of 30 to 90 parts by weight of a thermoplastic polyurethane elastomer, and 10 to 70 parts by weight of vinyl chloride-vinyl acetate-vinyl alcohol cross-linking copolymer resin, per 100 parts by weight of said elastomer and resin, and, as a cross-linking agent, hexakis(methoxymethyl) melamine resin, in amount effective to cross-link said cross-linking resin.

2. A composition as in claim 1 dissolved in an inert volatile organic solvent.

3. A cross-linked composition as in claim 1.

4. A composition as in claim 3 in the form of a sheet resistant to dry cleaning.

5. A leather-like sheet comprising a flexible supporting substrate coated with a composition as in claim 3.

6. A flexible leather-like sheet material having hand and drape suitable for use in clothing comprising a slip coat layer made of a composition comprising a blend of a thermoplastic polyurethane elastomer and vinyl chloride-vinyl acetate-vinyl alcohol copolymer resin, and underlying laminate layer made of a composition as in claim 3, and a supporting textile fabric backing layer, said layers being united in face-to-face relationship.

7. A flexible leather-like sheet material as in claim 6 in which the proportions of (A) thermoplastic polyurethane elastomer and (B) vinyl chloride-vinyl acetate vinyl alcohol copolymer resin in said underlying laminate layer are from 70 to 90 parts of (A) and from 10 to 30 parts of (B), per 100 parts by weight of (A) plus (B).

8. A flexible leather-like sheet material as in claim 7 in which the proportions of (A) and (B) are 75 to 85 parts of (A) and 15 to 25 parts of (B) per 100 parts by weight of (A) plus (B).

9. A leather-like sheet material suitable for use as a shoe upper material comprising a skin coat layer made of a composition as in claim 3, an underlying plasticized polyvinyl chloride resin layer adhered to the skin coat layer, and a textile fabric backing layer on said underlying layer, the said layers being united in face-to-face relationship.

10. A patent leather-like sheet material as in claim 9 in which the proportions of (A) thermoplastic polyurethane elastomer and (B) vinyl chloride-vinyl acetate-vinyl alcohol copolymer resin in said skin coat layer are 35 to 65 parts of (A) and 35 to 65 parts of (B), per 100 parts by weight of (A) plus (B).

11. A patent leather-like sheet material as in claim 10 in which the proportions of (A) and (B) are 40 to 55 parts of (A) and 45 to 60 parts of (B), and the amount of hexakis(methoxymethyl)melamine resin is from 0.5 to 10 parts, per 100 parts by weight of (A) plus (B).

12. A leather-like dry-cleanable laminated fabric which is flexible, non-porous, and has a patent leather-like non-tacky slip-coat finish which is hard, dry and wear-resistant, comprising the following layers united in face-to-face relationship:
   i. a layer of textile fabric backing;
   ii. a laminate coat on one side of said fabric backing comprising a blend of (A) 75 to 85 parts by weight of thermoplastic polyurethane elastomer, (B) 15 to 25 parts by weight of vinyl chloride-vinyl acetate-vinyl alcohol cross-linking copolymer resin, and (C), as a cross-linking agent for said resin, 1 to 7 parts by weight of hexakis(methoxymethyl)melamine resin, per 100 parts by weight of (A) plus (B); and
   iii. a slip coat on the outer surface of said laminate coat comprising a blend of (A') 40 to 55 parts by weight of thermoplastic polyurethane elastomer, (B') 45 to 60 parts by weight of vinyl chloride-vinyl acetate-vinyl alcohol cross-linking copolymer resin, and (C') as a cross-linking agent for said resin, 1 to 7 parts by weight of hexakis(methoxymethyl) melamine resin, per 100 parts by weight of (A') plus (B').

13. A leather-like dry-cleanable laminated footwear upper material which is flexible and non-porous and has a durable non-tacky patent leather finish skin coat, comprising the following layers united in face-to-face relationship:
   i. a layer of textile fabric backing;
   ii. a plasticized polyvinyl chloride resin layer on one side of said fabric backing; and
   iii. a skin coat adhered to the outer side of said resin layer comprising a blend of (A) 40 to 55 parts by weight of thermoplastic polyurethane elastomer, (B) 45 to 60 parts by weight of vinyl chloride-vinyl acetate-vinyl alcohol cross-linking copolymer resin, and (C), as a cross-linking agent for (B), 1 to 7 parts by weight of hexakis(methoxymethyl)melamine resin, per 100 parts by weight of (A) plus (B).

14. A leather-like dry-cleanable laminated sheet material having hand and drape suitable for clothing, which is flexible and has a soft hand non-patent finish comprising the following layers united in face-to-face relationship:
   i. a layer of textile fabric backing;
   ii. a laminate coat on one side of said fabric backing comprising a blend of (A) 75 to 85 parts by weight of thermoplastic polyurethane elastomer, (B) 15 to 25 parts by weight of vinyl chloride-vinyl acetate-vinyl alcohol cross-linking copolymer resin, and (C), as a cross-linking agent for said resin, 1 to 7 parts by weight of hexakis(methoxymethyl) melamine resin, per 100 parts by weight of (A) plus (B); and iii. a slip coat on the outer surface of said laminate coat comprising a blend of (A') 75 to 85 parts by weight of thermoplastic polyurethane elastomer, and (B') 15 to 25 parts by weight of vinyl chloride-vinyl acetate-vinyl alcohol copolymer resin per 100 parts by weight of (A') plus (B'), the said cross-linking agent (C) being present only in said layer (ii) for the purpose of curing the said resin (B) therein.

* * * * *